Patented Sept. 4, 1934

1,972,138

UNITED STATES PATENT OFFICE 1,972,138

AZO DYES, AND METHOD OF MAKING THE SAME

George Holland Ellis, Spondon, near Derby, England, assignor to Celanese Corporation of America, a corporation of Delaware No Drawing. Application April 28, 1932, Serial No. 608,136. In Great Britain June 6, 1931

9 Claims. (Cl. 260—87)

This invention relates to the manufacture of new azo dyestuffs and to the application of the said dyestuffs to the coloration of textile materials, particularly those made of or containing cellulose esters or ethers.

In U. S. Patent No. 1,600,277 is described and claimed the coloration of cellulose acetate materials by means of non-sulphonated azo derivatives of the pyrazolone series. We have now found that azo dyestuffs containing a residue of a pyrazolone and also a phenolic ester group are, especially when unsulphonated, particularly valuable coloring matters for cellulose acetate and other cellulose esters and ethers. These new azo coloring matters are in general relatively difficultly volatile and are therefore of particular value for printing purposes or for use in other circumstances where resistance to high temperatures and in particular resistance to steaming are an advantage. Further, they share with other pyrazolone azo dyes a marked resistance to reducing agents, particularly stannous chloride and other stannous salts, and are therefore of very great value for the coloration of stannous discharges in the manner claimed broadly in U. S. application S. No. 500,428 filed 5th December, 1930.

The preparation of the new coloring matters may be effected in various ways. For example, azo pyrazolone dyestuffs containing hydroxyl groups may be subjected to esterification with organic acids. Again, the new dyestuffs may be synthesized from suitable components containing phenolic ester groups.

Thus for example the hydroxyl groups of azo dyes obtainable by coupling hydroxy aromatic diazo compounds with 1-aryl-5-pyrazolones or by coupling aromatic diazo compounds with hydroxy-1-aryl-5-pyrazolones, may be esterified by means of anhydrides or chlorides of aliphatic or aromatic carboxylic or sulphonic acids or even by means of the free acids themselves. Esterification of hydroxyl groups may be effected in the presence or absence of basic substances, for example organic or inorganic bases, and in the presence or not of diluents. It has however been found particularly convenient to employ organic carboxylic anhydrides, particularly acetic anhydride, in the absence of a basic substance, and in the presence of a diluent, for example acetic acid.

Particularly useful dyestuffs may be produced by esterifying, especially with acetic acid residues, the hydroxyl groups of the unsulphonated azo dyestuffs obtainable by coupling diazotized amino phenols with 1-phenyl-3-methyl-5-pyrazolones. The dyestuff derived in this way from p-amino phenol and the pyrazolone in question has been found of especial interest on account of its pure yellow shade and its resistance to stannous discharges and the steaming operations to which printed textile materials are commonly subjected.

As stated above the new dyestuffs may also be synthesized from suitable components containing phenolic ester groups. Thus, for example a diazo compound containing such a group may be coupled with a pyrazolone, or a convenient diazo compound may be coupled with an esterified hydroxy-aryl-3-methyl-5-pyrazolone. Para-amino phenol may, for instance, be diazotized in the usual manner and the diazo solution, after neutralization of mineral acid by means of sodium acetate, may be stirred with acetic anhydride in order to acetylate the hydroxyl group. The resulting solution containing para-acetoxy diazo benzene may thereupon be directly coupled with 1-phenyl-3-methyl-5-pyrazolone.

The particular pyrazolone derivatives or residues specified may be replaced by other pyrazolone compounds. For example, the 1-aryl-3-methyl-5-pyrazolones may be replaced by the corresponding 3-carboxylic acids or by 1:3-dimethyl-5-pyrazolone or 1-naphthyl-3-methyl-5-pyrazolone. Again in place of acetic acid residues the dyestuffs may contain residues of other acids, for example other aliphatic acids e. g. other lower fatty acids, or hydroxy fatty acids such as lactic acid.

The new azo dyestuffs may be applied to textile materials in any convenient manner. For the coloration of cellulose ester and ether materials the dyestuffs may be applied in aqueous or other solutions, where sufficiently soluble, or in the form of aqueous or other dispersions. Such dispersions may be prepared for instance by grinding the dyestuff with or without water or other liquid, e. g. in colloid mills, by dissolving the dyestuff in a solvent and thereafter mixing with water containing or not containing protective colloids or dispersing agents, or by treatment of the dyestuff with dispersing agents with or without protective colloids and/or liquids, e. g. water, or by a combination of two or more of the foregoing methods. As dispersing agents, particular mention may be made of those described in U. S. Patents Nos. 1,618,413, 1,618,414, 1,694,413, 1,840,572, 1,716,721, and U. S. applications S. Nos. 390,423 filed 4th September, 1929, and 390,424 filed 4th September 1929. Other dispersing agents may however be employed and if desired dispersing agents may be employed in conjunction with substances having a solvent action on the coloring matters, for example the auxiliary solvents described in U. S. Patents Nos. 1,690,481 and 1,803,008.

Dispersions of the new coloring matters may be prepared in such form that they may be directly applied for dyeing or printing purposes or, if desired, they may be prepared in the form of more or less concentrated preparations adapted to yield by dilution, and with or without addition of dispersing agents or the like, dyebaths or printed pastes suitable for direct application. These preparations may be in liquid, paste, solid, powdered or in any desired other form. They may be prepared directly of the desired concentration or they may be obtained by concentration of less concentrated preparations.

The coloring matters may be applied to textile materials in any desired manner, whether by dyeing or other mode of uniform application or by printing, stencilling or other method of local application. For printing purposes it is in general found convenient, when the dyestuffs are insoluble in water, to employ suspensions or dispersions prepared by simply milling the dyestuffs with water. Thickening agents may of course be added to adapt the coloring matter dispersions to the precise mode of local application utilized. If desired the new dyestuffs may be produced on the materials by coupling suitable components thereon. For example, cellulose acetate material may be impregnated with an aromatic amine containing a phenolic ester group and the latter diazotized and developed with 1-phenyl-3-methyl-5-pyrazolone.

As explained previously the coloring matters are of particular value for the coloration of materials made of or containing cellulose acetate or other cellulose esters or ethers. As examples of such other esters of cellulose mention may be made of cellulose formate, cellulose propionate and cellulose butyrate and the products obtainable by esterifying cellulose while retaining its fibrous structure, such as the product known as immunized cotton and obtained by treating alkalyzed cellulose with para-toluene sulphonic chloride. As examples of cellulose ethers there may be mentioned methyl, ethyl and benzyl cellulose.

Mixed materials containing one or other of the foregoing cellulose esters or ethers may likewise be colored by means of the new dyestuffs and the various components of such mixed materials may be colored in solid or contrasting shades according to the affinity of the dyestuffs therefor and according to the effects required.

The invention is illustrated but not limited by the following example:—

*Example*

10 parts of para-hydroxy-benzene-azo-1-phenyl-3-methyl-5-pyrazolone, 25 parts of acetic acid and 25 parts of acetic anhydride are boiled together in a reflux condenser for two hours. After cooling and allowing to stand for a time the new dyestuff is filtered off and washed with methylated spirits. It forms orange colored crystals and yields pure yellow shades on cellulose acetate when applied in the form of an aqueous dispersion, e. g. by dyeing or printing methods.

In a similar manner dyestuffs may be prepared by acetylating the azo dyestuff from diazo-benzene and 1-p-hydroxy-phenyl-3-methyl-5-pyrazolone or the azo dyestuff from p-hydroxy-diazo-benzene and 1-α-naphthyl-3-methyl-5-pyrazolone.

What I claim and desire to secure by Letters Patent is:—

1. Process for producing unsulphonated azo dyestuffs, which comprises esterifying a phenolic hydroxyl group of an unsulphonated hydroxylated-pyrazolone-azo dyestuff with an organic carboxylic acid residue.

2. Process for producing unsulphonated azo dyestuffs, which comprises esterifying a phenolic hydroxyl group of an unsulphonated hydroxylated-pyrazolone-azo dyestuff with an acetic acid residue.

3. Process for producing unsulphonated azo dyestuffs, which comprises esterifying a hydroxy-benzene-azo-1-aryl-3-methyl-5-pyrazolone with an organic carboxylic acid residue.

4. Process for the production of azo dyestuffs, which comprises acetylating para-hydroxy-benzene-azo-1-phenyl-3-methyl-5-pyrazolone.

5. Process for the manufacture of azo dyestuffs, which comprises coupling a diazo compound with a pyrazolone coupling component, both components being free from sulphonic groups, and at least one of the components containing a phenolic hydroxyl group esterified with an organic carboxylic acid.

6. Process for the production of azo dyestuffs, which comprises coupling an aromatic diazo compound containing an acetoxy group with a 1-aryl-3-methyl-5-pyrazolone, both components being free from sulphonic groups.

7. Process for the production of an azo dyestuff, comprising coupling para-acetoxy-diazo-benzene with 1-phenyl-3-methyl-5-pyrazolone.

8. Unsulphonated pyrazolone azo dyestuffs containing a phenolic hydroxyl group esterified with an organic carboxylic acid.

9. Para - acetoxy - benzene - azo - 1 - phenyl-3-methyl-5-pyrazolone.

GEORGE HOLLAND ELLIS.